United States Patent [19]
El-Hibri

[11] Patent Number: 6,124,399
[45] Date of Patent: *Sep. 26, 2000

[54] HIGH IMPACT STRENGTH POLYSULFONES

[75] Inventor: M. Jamal El-Hibri, Atlanta, Ga.

[73] Assignee: Bz Amoco Corporation, Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/991,076

[22] Filed: Dec. 16, 1997

Related U.S. Application Data

[60] Provisional application No. 60/044,313, Apr. 24, 1997.

[51] Int. Cl.[7] .................................................... C08L 81/06
[52] U.S. Cl. ............................. 525/67; 525/68; 525/133; 525/148; 525/150
[58] Field of Search ............................... 525/67, 68, 133, 525/148, 150

[56] References Cited

U.S. PATENT DOCUMENTS

| | | | |
|---|---|---|---|
| 3,365,517 | 1/1968 | Barth et al. | 260/860 |
| 3,944,631 | 3/1976 | Yu | 525/305 |
| 4,148,842 | 4/1979 | Yu | 525/67 |
| 4,360,636 | 11/1982 | Silberberg | 525/68 |
| 4,861,837 | 8/1989 | Dickinson et al. | 525/394 |

*Primary Examiner*—Patricia A. Short
*Attorney, Agent, or Firm*—Richard J. Schlott; Thomas E. Nemo

[57] ABSTRACT

High impact polysulfone blends containing a polysulfone and from about 10 to about 25 wt % of an impact modifier formulation comprising an acrylate rubber and a polycarbonate, and a method for providing supertough polysulfones.

8 Claims, No Drawings

HIGH IMPACT STRENGTH POLYSULFONES

This application claims the benefit of U.S. Provisional Application No. 60/044,313, filed Apr. 24, 1997.

BACKGROUND OF THE INVENTION

This invention relates to polysulfones, and more particularly to impact modification of polysulfone resin. Still more particularly, the high impact strength polysulfones of this invention are polymer blends containing, in addition to a polysulfone, an impact modifier formulation comprising an acrylate core-shell type rubber and a polycarbonate. These blends are characterized by remarkably high impact strengths and an excellent balance of mechanical properties.

Poly(aryl ether) resins, for example, the polysulfone polymers and copolymers derived from Bisphenol A or dihydroxydiphenyl sulfone and 4,4'-dichlorodiphenyl sulfone, are widely accepted for use because of their good strength and thermal properties, and for their stability in a variety of environments. Even though these resins exhibit good impact in un-notched applications, the presence of notching or other surface discontinuities gives rise to stress concentration points and considerably weakens molded parts and extruded goods made from polysulfone. Thus, the impact strengths of polysulfone resins are typically low as measured by mechanical tests such as the notched Izod impact test.

Improvement in impact strength and ductility are needed for better performance of articles fabricated from polysulfones for use in high impact applications and especially those in which the articles may be subject to cracks or have imperfections. Of course, it also is important that such improvements be achieved without substantial adverse effects on desirable properties of the polysulfone. The acceptance of polysulfones over other resins by the compounding art for many applications depends on the resin's excellent stability in a variety of adverse environments, even at elevated temperatures. Methods for increasing resin ductility and impact at the expense of such environmental stability would likely not be readily adopted by the industry.

It also is important that the additives retain their effectiveness after processing and fabricating of the impact-modified polysulfone formulations, as well as during use of articles prepared therefrom.

A variety of impact modifiers are known for use with thermoplastics. Generally, these modifiers are rubbery compositions that can be blended or incorporated into the thermoplastics. Very few rubbery modifiers have been found to be effective for improving impact in polysulfone resins. Those that do, often cause adverse affects losses in other key polysulfone properties. Other impact modifiers that are effective are difficult and/or expensive to produce and thus not available commercially. The impact properties of polysulfone may be improved by using acrylate rubbers, and it is known that a binary blend of a polysulfone and an acrylate copolymer impact modifier has better impact properties than a neat polysulfone. However, these binary blends are also notch sensitive, and the improvement in notched impact strength observed for these blends, if any, is small.

Binary blends of polysulfones and polycarbonates are also well known. Polycarbonates are generally known for their high impact strength properties. When blended with polysulfones, such blends exhibit particularly good hydrolytic stability and are described in the art as having particularly good resistance to environmental stress crazing and cracking. Blends of polysulfones and polycarbonates may thus be useful in a variety of applications where exposure to hot, humid environments is contemplated. However, even though these blends may exhibit an excellent balance of mechanical properties including tensile strength, the addition of a polycarbonate to a polysulfone resin provides little or no improvement in impact properties. The blends are quite notch sensitive and generally have very modest notched impact properties, severely limiting their commercial acceptance.

The good mechanical properties and environmental performance characteristics of polysulfones are thus very important to many applications. Overcoming the low notched impact of polysulfones while maintaining these properties to a high degree, even at elevated temperatures, would widen their commercial utility. Modifiers capable of improving the ductility and particularly the impact characteristics of molded polysulfone articles and extruded goods when used at low concentration levels and further capable of retaining good ductility and low notch sensitivity, particularly over a wide range of temperatures, would give compounders and resin formulators greater flexibility in tailoring the property balance of polysulfone formulations to provide materials well suited for use in a wider variety of applications.

Therefore, there exists a need for a composition which exhibits reduced notch sensitivity, and thereby possesses excellent notched impact strength properties which maintains the other desirable physical and chemical properties of polysulfones.

BRIEF SUMMARY OF THE INVENTION

The high impact strength polysulfone formulations of this invention are polymer blends containing, in addition to a polysulfone, an impact modifier formulation comprising an acrylate core-shell type rubber and a polycarbonate. The invented compositions exhibit very high notched impact strengths and thus may be characterized as supertough polysulfones. The invention may also be characterized as a method for providing supertough polysulfones.

DETAILED DESCRIPTION OF THE INVENTION

The supertough polysulfone polymer blends according to the invention will comprise a polysulfone resin and an impact modifier composition comprising an acrylate core-shell type rubber and a polycarbonate. Polysulfone resins useful in the practice of this invention, also known and described in the art as poly(aryl ether sulfone) resins, include polysulfones comprising repeat units made up of Bisphenol A moieties and diphenyl sulfone moieties as represented by the structural formula

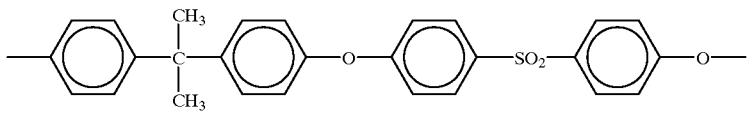

Such polysulfone resins are readily available from commercial sources, including, for example, as UDEL® polysulfone resin from Amoco Polymers, Inc.

Polyether sulfones, polymers which may be derived for example from dihydroxydiphenyl sulfone and dichlorodiphenyl sulfone and thus contain only diphenyl sulfone moieties repeat units, are also known in the art. Such resins, frequently termed PES resins, are available from commercial sources, for example, Sumika Excel polyether sulfone resins from Sumitomo Chemical. PES resins, as well as a variety of copolymers comprising Bisphenol A moieties and diphenyl sulfone moieties in molar ratios other than 1:1 such as the Ultrason sulfone resins available from BASF, may also be found to be suitable for use as the polysulfone resin component in the practice of this invention.

Methods for the preparation of poly(aryl ether sulfones) are widely known and several suitable processes have been well described in the art. The resins may generally be prepared by either of two methods, i.e., the carbonate method or the alkali metal hydroxide method. The molecular weight of the polysulfone, as indicated by reduced viscosity data in an appropriate solvent such as methylene chloride, chloroform, N-methylpyrrolidone, or the like will be at least 0.3 dl/g, preferably at least 0.4 dl/g and, typically, will not exceed about 1.5 dl/g.

The acrylate core-shell type rubber suitable for use in the practice of the invention will generally comprise from about 50 to 95 percent by weight of a first elastomeric phase and about 50 to 5 percent by weight of a second, rigid, thermoplastic phase. The first phase is polymerized from about 75 to 99.8 percent by weight $C_1$ to $C_6$ alkyl acrylate, resulting in an acrylate rubber core which is crosslinked with about 0.1 to 5 percent by weight of a suitable cross-linking monomer and to which is added about 0.1 to 5 percent by weight of a graft-linking monomer.

Suitable alkyl acrylates include methyl acrylate, ethyl acrylate, isobutyl acrylate and n-butyl acrylate. The preferred acrylate is n-butyl acrylate. Suitable crosslinking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred cross-linking monomer is butylene diacrylate.

The graft-linking monomer provides a residual level of unsaturation in the elastomeric phase, particularly in the latter stages of polymerization and, consequently, at or near the surface of the elastomeric particle. The preferred graft-linking monomers are alkyl methacrylate and dialkyl maleate. The rigid thermoplastic phase may be comprised of $C_1$ to $C_{16}$ methacrylate, styrene, acrylonitrile, alkyl acrylates, alkyl methacrylate, dialkyl methacrylate and the like. Preferably, this phase is at least about 50 weight percent $C_1$ to $C_4$ alkyl methacrylate.

Methacrylate-butadiene-styrene (MBS) core shell graft copolymers formed from a rubber-elastic core comprising polybutadiene and a hard graft shell are also disclosed in the art, alone and in combination with particular stabilizer formulations, as impact modifiers for a variety of thermoplastics. The preparation of acrylate graft copolymers is well described in the art. Acrylate rubber modifiers suitable for use in compositions of this invention are available commercially, including an acrylate rubber modifier obtainable from the Rohm & Haas Corporation, Philadelphia, Pa. under the tradename Paraloide® EXL-3361.

Polycarbonates suitable for use in the practice of the invention are high molecular weight, thermoplastic, aromatic polymers, including homopolycarbonates, copolycarbonates and copolyestercarbonates and mixtures thereof, which have average molecular weights of about 8,000 to more than 200,000, preferably of about 20,000 to 80,000 and an I.V. of 0.40 to 1.0 dl/g as measured in methylene chloride at 25° C.

The polycarbonates may conveniently be derived from dihydric phenols and carbonate precursors. Typical of the dihydric phenols suitable for use in producing polycarbonates are 2,2-bis(4-hydroxyphenyl)propane (Bisphenol A), bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl) propane, 2,2-(3,5,3',5'-tetrabromo-4,4'-dihydroxyphenyl)-propane, and 3,3'-dichloro-4,4'-dihydroxydiphenyl methane. Other suitable dihydric phenols are also available, including those disclosed in U.S. Pat. Nos. 2,999,835, 3,038,365, 3,334,154, and 4,131,575. The carbonate precursor employed may be a carbonyl halide such as phosgene, a carbonate ester or a haloformate.

The polycarbonates may be manufactured by a variety of widely known processes such as, for example, by reacting a dihydric phenol with a carbonate precursor such as diphenyl carbonate or phosgene in accordance with methods set forth in the above-cited literature and in U.S. Pat. Nos. 4,018,750 and 4,123,436, or by transesterification processes such as are disclosed in the U.S. Pat. No. 3,153,008, as well as other processes known to those skilled in the art.

Suitable polycarbonate resins are also readily available from a variety of commercial sources, including poly (Bisphenol A carbonate) resins available as Lexan® polycarbonate resins from the General Electric Company and Makrolon® polycarbonate resins from Bayer Corporation.

In accordance with the present invention, the impact modifying composition containing polycarbonate and acrylate rubber modifier will comprise the polycarbonate component and the acrylate rubber in a weight ratio of polycarbonate:acrylate rubber in the range of from about 5:1 to about 1:1.

The high impact strength polysulfone compositions of this invention will comprise from about 70 to about 92 wt % polysulfone and from about 30 to about 8 wt % of the impact modifying combination of polycarbonate and acrylate rubber.

Stated in terms of the total of weight of the three resin components of the polysulfone compositions of this invention, the compositions will comprise from about 70 to about 92 wt % polysulfone, from about 25 to about 5 weight percent of the polycarbonate, and from about 3 to about 10 wt %, preferably about 3 to about 7 wt % acrylate core-shell type rubber.

The polysulfone compositions of the present invention may be further compounded to include up to about 60 wt % of various additives to improve or modify various chemical and physical properties. Examples of such additives include flame retardants, anti-oxidants, light stabilizers, processing aids, colorants, fillers and reinforcing agents. Suitable as reinforcing agents are glass fibers and carbon fibers including graphitic fibers. Metal fibers, alumina and aluminum silicate fibers, aluminum oxide fibers, rock wool fibers and the like may also be found useful for particular applications. Representative filler materials include particulate and powdered forms of calcium silicate, silica, clays, talc, mica, carbon black, titanium dioxide, wollastonite, polytetrafluoroethylene, graphite, alumina trihydrate, sodium aluminum carbonate, baryte and the like. The appropriate types and levels of such additives will depend on processing techniques and on the end use of the resultant product, and can be determined by those skilled in the art.

The polysulfone compositions according to this invention may be compounded using any of the variety of compounding and blending methods well-known and commonly used in the resin compounding arts. Conveniently, the polysulfone and modifying components, in powder, pellet or other suitable form, may be melt compounded at temperatures effective to render the resinous components molten using a high shear mixer, e.g., a twin-screw extruder, to obtain a desirably uniform blend. The components may be first combined in solid form, such as powder or pellets, prior to melt compounding to facilitate mixing. Particulates, fibers and other additives may be incorporated into one or more of the components prior to combining with the remaining components, or the components may be physically mixed in powder or pellet form using conventional dry-blending methods and then extrusion compounded. Plasticating the resin in a compounding extruder and feeding the additives, particulates or fibers to the molten composition through a port in the extruder as is also commonly practiced in the art may be found useful in compounding the compositions of this invention.

The invented high impact strength polysulfone compositions may be injection molded, or fabricated to form film, sheets or other forms using any of a variety of processes and methods well-known and widely practiced in the fabricating arts, e.g. melt extrusion of sheets, film, tubing or profile. The compositions may also be used as matrix materials or binders for composite or laminated structures and, when further compounded with from 5 to 60 wt % of one or more reinforcing fillers such as glass fiber or carbon fiber or the like, as well as with fillers such as clay, talc and mineral fillers and the like, may be found particularly desirable in molded goods intended for use in extreme environments.

The invented compositions have application in a wide variety of physical shapes and forms, including films, molded goods, and extruded products. When used as films or when made into molded or extruded products, these blends, including filled and laminated products prepared therefrom, not only possess good physical properties and excellent chemical resistance at room temperature but they retain their strength and good performance at elevated temperatures for long periods of time. Films and molded articles formed from the high impact strength composition of this invention may be particularly useful in automotive applications and in durable goods and appliances, medical and plumbing applications where resistance to hot, humid environments may be particularly important, and safety equipment and protective gear.

The invention will be better understood by way of consideration of the following illustrative examples and comparison examples, which are provided by way of illustration and not in limitation thereof. In the examples, all parts and percentages are by weight unless otherwise specified.

EXAMPLES

The resin components employed in the examples include:

Polysulfone: Poly(aryl ether sulfone) containing Bisphenol A moieties and diphenyl sulfone moieties, obtained as Udel polysulfone resin from Amoco Polymers, Inc.

P'carbonate: Poly(Bisphenol A carbonate), obtained as Lexan Bisphenol A polycarbonate resin from General Electric Company.

Rubber: Acrylate core-shell type rubber, obtained as Paraloid EXL-3361 Acrylate graft copolymer rubber modifier from Rohm and Haas Corporation.

Compounding was accomplished by dry-blending dried resin with the additives and feeding the blend to a 25 mm Berstorff co-rotating, partially intermeshing twin screw extruder. The compounded polymer was extruded through a strand die into water, then chopped to form pellets. The various components as well as the parts thereof in each of the blends are indicated in Table 1 below. The compositions also contained 0.1 wt % Irganox 1010 thermal stabilizer from Ciba Geigy Company.

The blends were injection molded to provide test specimens generally by using an Arburg injection molding machine operated at barrel temperatures of 299° C. in a first zone, 310° C. in a second zone and 310° C. in a final zone. Mold temperature was 121° C. The mechanical properties are room temperature properties unless otherwise indicated, and were determined according to ASTM published procedures D-638 (tensile properties), D-790 (flexural properties) and D-256 (notched Izod impact) unless otherwise noted. The heat deflection properties were determined on unannealed samples by ASTM D-648.

For comparison purposes, three formulations, C-1 through C-4, comprising the polysulfone, the polysulfone in combination with the acrylate rubber modifier alone and the polysulfone with the polycarbonate alone were prepared, molded and tested following the same procedures.

The mechanical properties of the invented impact-modified compositions of Examples 1–4 and of the comparison compositions are summarized in Table 1.

TABLE 1

Composition and Mechanical Properties of Impact-modified Polysulfone Compositions and Comparison Compositions

| Example | 1 | 2 | 3 | 4 | C-1 | C-2 | C-3 | C-4 |
|---|---|---|---|---|---|---|---|---|
| Composition[1] | | | | | | | | |
| Polysulfone pbw | 75 | 80 | 85 | 90 | 50 | 75 | 95 | 100 |
| P'carbonate pbw | 20 | 15 | 10 | 5 | 50 | 25 | — | — |

TABLE 1-continued

Composition and Mechanical Properties of Impact-modified Polysulfone Compositions and Comparison Compositions

| Example | 1 | 2 | 3 | 4 | C-1 | C-2 | C-3 | C-4 |
|---|---|---|---|---|---|---|---|---|
| Rubber pbw | 5 | 5 | 5 | 5 | — | — | 5 | — |
| P'carbonate/rubber wt ratio | 4:1 | 3:1 | 2:1 | 1:1 | — | — | — | — |
| Mechanical Properties[2] | | | | | | | | |
| Tensile Str. psi | 8,500 | 8,600 | 8,800 | 9,000 | 9,500 | 10,400 | 9,300 | 10,200 |
| Tensile Mod. Kpsi | 331 | 335 | 335 | 332 | 350 | 355 | 337 | 360 |
| Elongation % | 75 | 64 | 56 | 65 | 100 | 70 | 53 | 75 |
| Flex. Str. psi | 14,500 | 14,400 | 14,200 | 14,700 | 14,100 | 15,200 | 15,700 | 15,400 |
| Flex. Mod. Kpsi | 360 | 343 | 349 | 347 | 381 | 390 | 369 | 390 |
| Notched Izod* | 17.3 | 17.5 | 17.3 | 18.1 | 1.6 | 1.5 | 1.5 | 1.3 |
| HDT ° C. | 166 | 166 | 167 | 167 | 149 | 163 | 168 | 174 |

Notes:
[1]For details see text;
[2]For testing methods, see text. Tensile Str. = ultimate tensile strength; Elongation is at break;
*units are ft.-lb/in notch; HDT = heat deflection temperature at 264 psi deflection.

It will be readily apparent from consideration of the above test results that the impact-modified polysulfones of Examples 1–4 are supertough polysulfone compositions. The impact strength of these compositions are substantially improved over the polysulfone alone, C-4, and over compositions comprising polysulfone together with an acrylate modifier alone, C-3. In addition, the 50/50 and 80/20 blends of polysulfone and polycarbonate, C-1 and C-2, are also seen to have relatively low impact, far below the impact properties regarded by the art as characteristic of super-toughened engineering resins.

The un-notched Izod impact properties for all of the blend examples and control examples were also determined; none broke in the testing. The notch-sensitive nature of polysulfones and polysulfones containing only an impact modifier are thus readily apparent from the notched Izod impact properties for C-3 and C-4. Similarly, blends of a polysulfone with a polycarbonate, C-1 and C-2, also are highly notch-sensitive. The high impact properties and low notch sensitivity exhibited by the combination of a polysulfone, a polycarbonate and a minor amount of an acrylate rubber modifier, Examples 1–4, are thus unexpected.

The impact modifier combination of an acrylate rubber and a polycarbonate resin provides high impact polysulfone compositions with impact properties comparable with the properties of polycarbonate resin, an engineering thermoplastic widely used in applications where supertoughness properties are required. It will also be apparent from the property data for the compositions of Examples 1–4 that the improvement in impact strength is obtained with little reduction in other important mechanical and thermal properties, particularly tensile strength, flexural modulus and HDT.

The invention will thus be seen to be directed to high impact polysulfone compositions, and to a method for reducing the notch sensitivity of impact-modified polysulfones. The high impact, supertoughened polysulfones of this invention will comprise from about 70 to about 92 wt % polysulfone and from about 8 to about 30 wt % of an impact modifying composition containing an aromatic polycarbonate and an acrylate rubber in a polycarbonate:acrylate rubber ratio of from about 5:1 to about 1:1 by weight. The invented compositions may also be described as containing from about 70 to about 95 wt % polysulfone, from about 5 to about 25 wt % polycarbonate and from about 3 to about 10 wt % acrylate rubber.

The invention may also be characterized as a method for improving the notched impact properties and reducing the notch sensitivity of polysulfone resins, the method comprising compounding the polysulfone with up to 30 wt %, preferably from about 5 to about 30 wt % based on total resin components, of an impact modifier, said impact modifier being the combination of an aromatic polycarbonate and an acrylate rubber in a weight ratio of from about 5:1 to about 1:1.

Although the invention has been described and illustrated by way of specific embodiments set forth herein, those skilled in the art will recognize that alternative acrylate rubber modifiers, polycarbonates and polysulfones within the description of the invention are available or may be readily obtained and used. Still further modifications and variations will be readily apparent to those skilled in the resin formulating and composite fabricating art, and such variations and modifications will be understood to lie within the scope of the invention as defined by the appended claims.

I claim:

1. A composition comprising from about 75 to about 90 wt % polysulfone, from about 20 to about 5 wt % of a thermoplastic polycarbonate and from about 3 to about 7 wt % of an acrylate rubber.

2. The composition of claim 1 wherein said polysulfone comprises units represented by the structural formula:

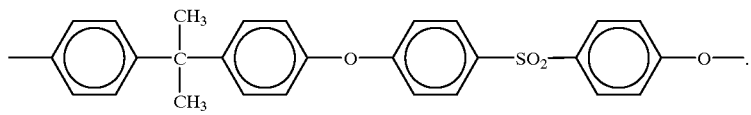

3. The composition of claim 1 wherein the polycarbonate is poly(Bisphenol A carbonate).

4. A method for reducing the notch sensitivity of polysulfone, said method comprising the steps of forming a blend of said polysulfone with a polycarbonate and an acrylate rubber in a weight ratio of polycarbonate:acrylate rubber of from about 5:1 to about 1:1, wherein said blend comprises no more than 10 wt % said acrylate rubber, based on total weight of resins, and molding said blend.

5. The method of claim 4 wherein the polycarbonate is poly(Bisphenol A carbonate).

6. The method of claim 4 wherein the combined weight of said polycarbonate and said acrylate rubber comprises from about 25 to about 10 wt % of said blend, based on total weight of resin components.

7. The method of claim 4 wherein the acrylate rubber modifier comprises from about 25 to 95 percent by weight of a first elastomeric phase polymerized from about 75 to 99.8 percent by weight $C_1$ to $C_6$ alkyl acrylate, 0.1 to 5 percent by weight of a cross-linking monomer and about 0.1 to 5 percent by weight of a graft-linking monomer and about 75 to about 5 percent by weight of a second rigid thermoplastic phase.

8. A composition comprising from about 75 to about 90 wt % polysulfone, from about 20 to about 5 wt % of a thermoplastic polycarbonate and from about 3 to about 7 wt % of an acrylate rubber, said composition having a notched Izod impact strength of at least about 17.3 ft. lb./in.

* * * * *

UNITED STATES PATENT AND TRADEMARK OFFICE
CERTIFICATE OF CORRECTION

PATENT NO. : 6,124,399
DATED : September 26, 2000
INVENTOR(S) : M. Jamal El-Hibri It is certified that error appears in the above-identified patent and that said Letters Patent is hereby corrected as shown below:

Col.    Line

7,8
(IN TABLE 1)

"Example . . . C-3
Notched Izod . . . 1.5"

should read:
"Example . . . C-3
Notched Izod . . . 3.5"

Signed and Sealed this

Eighth Day of May, 2001

Attest:

NICHOLAS P. GODICI

*Attesting Officer*    Acting Director of the United States Patent and Trademark Office